United States Patent [19]

Little et al.

[11] 4,263,269

[45] Apr. 21, 1981

[54] REMOVAL OF ORGANIC CONTAMINANTS FROM AQUEOUS HYDROCHLORIC ACID

[75] Inventors: John C. Little, Danville; Charles R. Youngson, Jr., Martinez, both of Calif.

[73] Assignee: The Dow Chemical Company, Midland, Mich.

[21] Appl. No.: 146,723

[22] Filed: May 5, 1980

Related U.S. Application Data

[63] Continuation of Ser. No. 960,377, Nov. 13, 1978, abandoned.

[51] Int. Cl.$^3$ .............................................. C01B 7/07
[52] U.S. Cl. ...................................... 423/488; 203/49; 203/91; 55/53; 55/54; 568/495; 570/245
[58] Field of Search ............... 423/240, 241, 481, 488; 260/659 A, 659 R; 203/49, 91; 55/52–54

[56] References Cited

U.S. PATENT DOCUMENTS

| | | | |
|---|---|---|---|
| 2,746,912 | 5/1956 | Park et al. .............................. | 202/42 |
| 3,140,224 | 7/1964 | Simek et al. ........................... | 202/46 |
| 3,378,597 | 4/1968 | Dehn 'et al. ....................... | 260/652 P |
| 3,488,398 | 1/1970 | Harpring et al. ..................... | 260/659 |
| 3,996,300 | 12/1976 | Ahlstrom ......................... | 260/652 P |
| 4,028,427 | 6/1977 | Tsao ................................. | 260/659 R |

FOREIGN PATENT DOCUMENTS

| | | | |
|---|---|---|---|
| 1129942 | 5/1962 | Fed. Rep. of Germany . | |
| 49-83694 | 8/1974 | Japan . | |
| 843996 | 8/1960 | United Kingdom .................... | 423/488 |

*Primary Examiner*—Earl C. Thomas
*Attorney, Agent, or Firm*—J. W. Ambrosius

[57] ABSTRACT

Method of removing organic contaminants from aqueous hydrochloric acid comprising countercurrently contacting the aqueous acid containing the contaminants and steam at superatmospheric pressures, and recovering said aqueous acid substantially free from organic contaminants. The invention is particularly adapted for the removal of chloral from aqueous hydrochloric acid.

8 Claims, No Drawings

REMOVAL OF ORGANIC CONTAMINANTS FROM AQUEOUS HYDROCHLORIC ACID

CROSS-REFERENCE TO RELATED APPLICATION

This is a continuation of application Ser. No. 960,377 filed Nov. 13, 1978, and now abandoned.

BACKGROUND OF THE INVENTION

The present invention relates to the removal of organic contaminants, such as chloral, from aqueous HCl. The problems associated with the removal of chloral from aqueous HCl are well known to those skilled in the art.

Hydrogen chloride resulting from chlorination reactions, either as unreacted starting material or as a by-product of such reactions, often contains organic materials as undesirable contaminants. Since the hydrogen chloride (HCl) is generally recovered with water, the resulting aqueous hydrochloric acid typically contains such undesirable contaminants. For example, the oxychlorination of ethylene with oxygen and HCl over a copper-containing catalyst yields ethylene dichloride (EDC) and water with small amounts of organic contaminants, such as chloral and others such as ethylene chlorohydrin, ethanol, dichloracetaldehyde and the like, which must be removed from the water-EDC-unreacted HCl mixture for a variety of reasons well known in the art. While a variety of methods can be employed to remove chloral from the EDC, such as, for example, as noted in U.S. Pat. Nos. 3,378,597; 3,488,398 and 3,996,300, the remaining HCl ends up either neutralized with base or contaminated with chloral and other organic contaminants if absorbed out in water before the base wash. Aqeuous HCl solutions contaminated with chloral also result from the manufacture of chloral by aqueous phase chlorination of materials such as acetaldehyde, paraldehyde, alcohol or their partially chlorinated derivatives.

The removal of chloral from aqueous HCl by distillation at atmospheric pressure is taught in Japanese Pat. No. 49 83,694, wherein the distillation is carried out in a batch still. However, a large portion of the HCl feed must be distilled off to reduce the chloral level; for example, about 50% of the feed must be distilled off in 10% HCl to reduce the chloral level to about 80 ppm. Such method is disadvantageous in that a high energy input level is required and in that large amounts of the HCl feed are lost overhead. In U.S. Pat. No. 2,746,912, HCl gas is added to concentrated chloral-water mixtures in an amount sufficient to provide 1 part HCl to 4 parts of water and the mixture is continuously distilled. While substantially water-free chloral is obtained as the overhead, the 10–36% aqueous HCl bottoms are contaminated with up to about 12% by weight chloral. Distillation of aqueous solutions of chloral, mono- and dichloroacetaldehyde at 1–5 atmospheres to remove the chloracetaldehydes is taught in German Pat. No. 1,129,942 a substantially chlorine-free residue being thus obtained.

SUMMARY OF THE INVENTION

It has been discovered that aqueous hydrochloric acid solutions contaminated with undesired organic contaminants can, surprisingly, be purified by subjecting the same to superatmospheric pressure distillation, thereby removing the organic contaminants from the aqueous acid and recovering aqueous hydrochloric acid substantially free from organic contaminants. The process of the present invention is particularly adapted for the removal and dehydration of chloral from aqueous hydrochloric acid, the same being accomplished at low energy consumption rates and with little overhead loss of HCl. The process is preferably carried out by countercurrently contacting the contaminated acid with steam at superatmospheric pressures in a packed column which assures efficient contact between the steam and acid.

DETAILED DESCRIPTION

The invention is a process for the removal of organic contaminants from aqueous hydrochloric acid comprising countercurrently contacting said aqueous hydrochloric acid with steam or reboiled aqueous acid vapors at superatmospheric pressures, thereby removing said organic contaminants from the aqueous acid, and recovering said aqueous hydrochloric acid substantially free from organic contaminants. Steam is preferably employed, although the aqueous HCl column bottoms can be regenerated with steam and the vapors recirculated.

Generally, the aqueous hydrochloric acid which can be treated according to the present invention results as a by-product from a chlorination procedure, such as noted in the Background hereof, and contains one or more volatile organic contaminants such as, for example, chloral, EDC, mono- and di-chloroacetaldehyde, ethanol, ethylene chlorohydrin and the like. These organic materials are typically present in amounts ranging from about 0.1 to about 50% by weight or more of the aqueous acid solution. The exact amount of any given contaminant will, of course, vary with the contaminant in question and the process by which the aqueous acid was produced. By say of illustration, the present process can be used to treat chloral-contaminated aqueous HCl solutions containing from up to about 25 wt. % HCl and from about 0.2 to about 50 or more wt. % chloral, preferably and more typically from about 0.2 to about 3.0 wt. % chloral (e.g., 2000 to 30,000 ppm). Other contaminants, such as ethanol and ethylene chlorohydrin can be present in amounts up to about 50% by weight or more; the amounts of mono- and di-chloroacetaldehyde, when present, generally range up to about 1% by weight or more while EDC usually is present in amounts up to about 4% by weight or more. Treated HCl solutions can thus be obtained having less than about 0.2, preferably less than about 0.1 wt. % chloral, and most preferably less than about 0.01 wt. % chloral.

The temperatures and pressures of the process generally range from about 100 to about 210° C. at superatmospheric pressures of from about 1 to about 230 psig. Preferred operating temperatures range from about 130 to about 200° C. while pressures of from about 30 to about 230 psig are preferably employed. A preferred aqueous HCl contaminated solution to be treated according to the process comprises from about 10 to about 20 wt. % HCl and from about 0.2 to about 3 wt. % chloral.

In another preferred embodiment, the aqueous HCl stream to be treated according to the invention is derived from the oxychlorination of ethylene with oxygen and HCl and comprises from about 7 to about 20 wt. % HCl, from about 0.2 to about 3 wt. % chloral, 0 to about 0.5 wt. % EDC, from about 500 to about 10,000 ppm dichloroacetaldehyde, from about 10 to about 100 ppm monochloroacetaldehyde, from about 10 to about 1000 ppm ethanol, and from about 10 to about 1000 ppm ethylene chlorohydrin. Preferably, the process of the present invention is conducted so as to recover purified HCl streams containing less than 0.1, more preferably less than 0.01 wt. % chloral, and less than about 10 ppm EDC, or other organic contaminants.

Preferably, the process of the present invention is carried out in a packed column, tray column, or other apparatus which assures efficient contact between the gas and the liquid. Contact of the steam and aqueous acid is usually accomplished in a countercurrent flow so as to assure efficient operation and adequate contact of steam and acid. Rates at which the aqueous hydrochloric acid may be treated and the organic contaminants removed are, of course, dependent upon the organic contaminant to be removed, the temperature and pressure employed, type and size of contacting means used, concentration of the acid and the like.

Employment of the process of the present invention usually results in a product of aqueous hydrochloric acid which is substantially free of organic impurities.

The invention is further illustrated by the following examples. All % are by weight unless otherwise stated.

EXAMPLE 1

A nominal 2-inch diameter teflon lined pipe seven feet long, packed to a height of 5 feet with ¼-inch ceramic saddles is used as the separating equipment. Thirty-five pounds per hour of an aqueous solution containing 2.2 wt. % chloral, 0.08 wt. % EDC, and 9.5% HCl at 139° is continuously fed to the top layer of packing, while 6.7#/hour of steam at 75 psig is piped into the column just below the lower packing support. Vapor exiting the column top (overheads) at 7#/hour, is condensed and found to contain 11 wt. % chloral, 0.35 wt. % EDC, and 2.4 wt. % HCl, while liquid exiting the column bottom (Bottoms) at 35#/hour is found to contain only 40 ppm chloral, 0 ppm EDC, and 9.1 wt. % HCl. The column operated at 156° C. and at 60 psig with pressure controlled through an $N_2$ pad. The HCl overhead loss amounted to only about 5%.

EXAMPLE 2

Utilizing the equipment and procedures of Example 1, additional runs were carried out at various column temperatures (115°–157° C.) and pressures (9–60 psig), feed flows, steam flows, and feed content (0.2–10 wt. % HCl; up to 6800 ppm EDC and 400–26,000 ppm chloral) and temperatures. As a result of such operations, purified HCl solutions were obtained, all of which had little or no EDC content and the majority of which had from 0 to 70 ppm chloral.

EXAMPLE 3

A nominal 3-inch diameter teflon lined pipe seven feet long packed with a 5-foot layer of ¼" ceramic saddles below the feed point and with 1 foot of ¼" ceramic saddles above the feed point is used as the separating equipment. One hundred and twenty pounds per hour of an aqueous solution containing 1906 ppm chloral, 435 ppm ethylene chlorohydrin 726 ppm dichloroacetaldehyde, 403 ppm EDC, 17 ppm monochloroacetaldehyde, 198 ppm ethanol and 17.6% HCl at 140° C. is continuously fed to the top layer of the 5-foot packed section while steam (24#/hour; 80 psig) is piped into the column just below the lower packing support. Water (4.3#/hour) is pumped into the top of the column above the 1-foot section of packing. The HCl liquid exits the column bottom at a rate of 134#/hour and is found to contain only 144 ppm ethylene chlorohydrin and no other organic contaminants. The column operated at 158° C. and 60 psig with pressure controlled through a nitrogen pad.

The best mode of practising the invention presently known to the inventors is the steam stripping of an aqueous hydrogen chloride solution resulting from the quenching of oxychlorination reactor gases and containing from about 0.2 to about 3.0 wt. % chloral. The stripping is carried out in a packed column at about 60 psig and at temperatures of about 155 to about 160° C.

What is claimed is:

1. A method of removing organic contaminants from aqueous hydrochloric acid which comprises countercurrently contacting said aqueous acid with steam or reboiled aqueous acid vapors under superatmospheric pressure conditions of from 30 to 250 psig, thereby removing organic contaminants therefrom, and thereafter recovering a purified, aqueous hydrochloric acid solution substantially free from organic contaminants.

2. The method of claim 1 wherein the organic contaminant is chloral.

3. The method of claim 2 wherein the purified acid solution contains less than about 0.1 wt. % chloral.

4. The method of claim 2 wherein the purified acid solution contains less than about 0.01 wt. % chloral.

5. The method of claim 1 wherein the aqueous hydrochloric acid is contaminated with chloral and EDC derived from the oxychlorination of ethylene with oxygen and HCl and the purified aqueous hydrochloric acid solution contains less than about 0.1 wt. % chloral.

6. The method of claim 5 wherein the purified solution contains less than about 10 ppm EDC.

7. The method of claim 5 wherein the purified aqueous hydrochloric acid solution contains less than about 0.01 wt. % chloral.

8. The method of claim 7 wherein the purified aqueous hydrochloric acid solution contains less than about 10 ppm EDC.

\* \* \* \* \*

UNITED STATES PATENT AND TRADEMARK OFFICE
CERTIFICATE OF CORRECTION

PATENT NO. : 4,263,269
DATED : April 21, 1981
INVENTOR(S) : John C. Little and Charles R. Youngson, Jr.

It is certified that error appears in the above—identified patent and that said Letters Patent is hereby corrected as shown below:

Column 4, line 34, delete "250" and insert -- 230 -- .

Signed and Sealed this

Sixth Day of October 1981

[SEAL]

*Attest:*

*Attesting Officer*

GERALD J. MOSSINGHOFF
*Commissioner of Patents and Trademarks*